Sept. 12, 1950   W. HAMILTON   2,521,973
CONTROL DEVICE AND OPERATOR THEREFOR
Filed Aug. 2, 1946   3 Sheets-Sheet 1
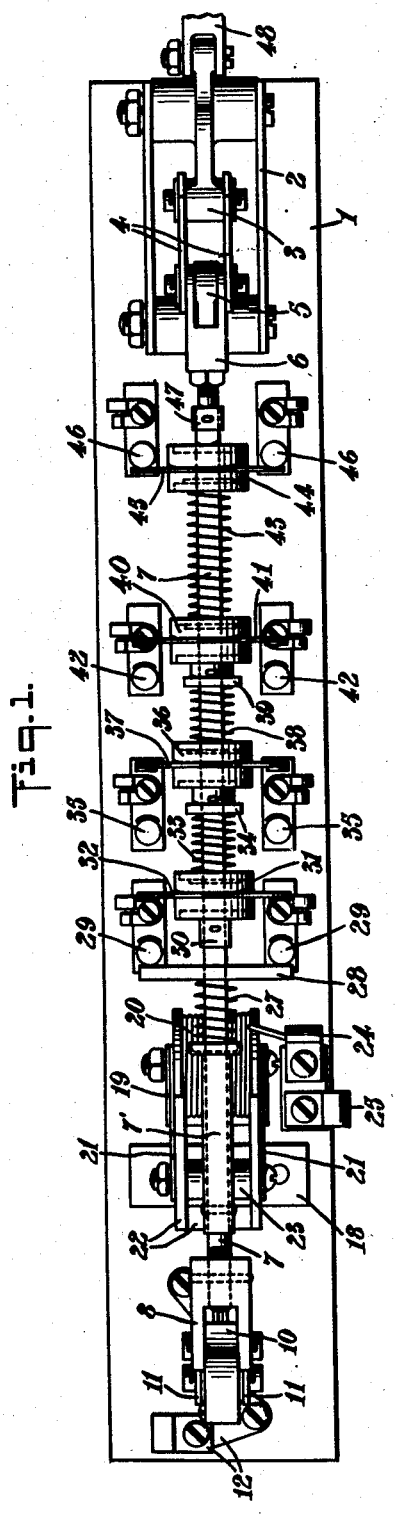
INVENTOR
WALLACE HAMILTON
BY Darby & Darby
ATTORNEYS.

Sept. 12, 1950 W. HAMILTON 2,521,973
CONTROL DEVICE AND OPERATOR THEREFOR
Filed Aug. 2, 1946 3 Sheets-Sheet 2
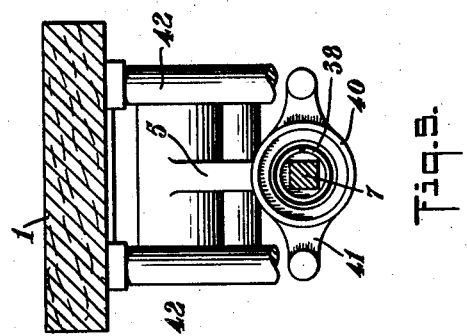
Fig. 5.
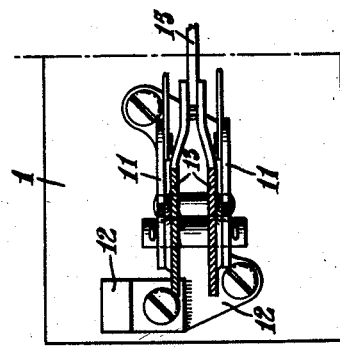
Fig. 6.
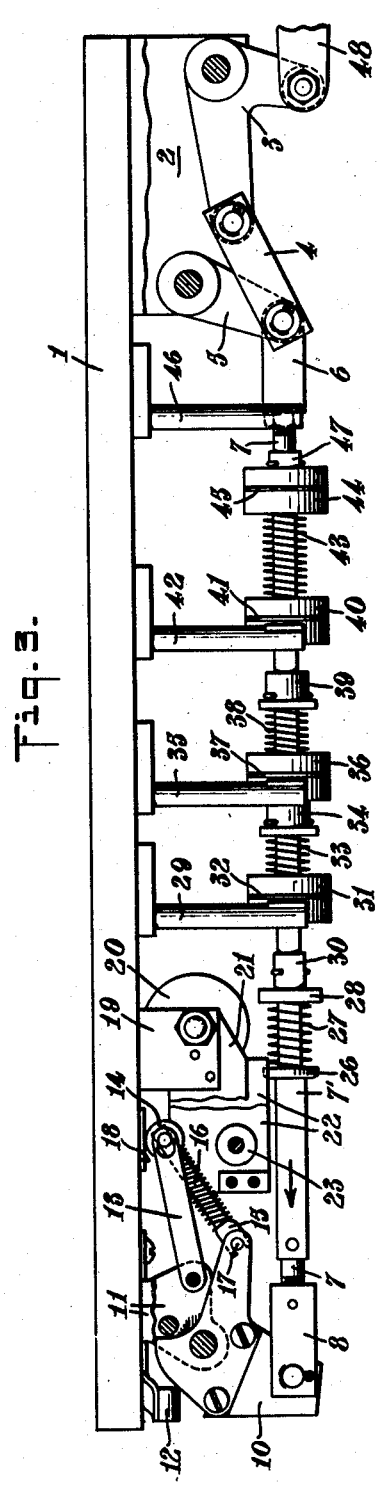
Fig. 3.
Fig. 4.
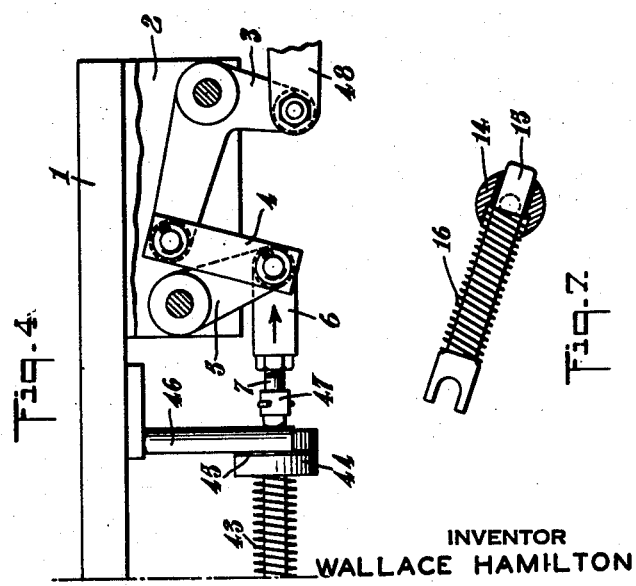
Fig. 7.
INVENTOR
WALLACE HAMILTON
BY Darby & Darby
ATTORNEYS.

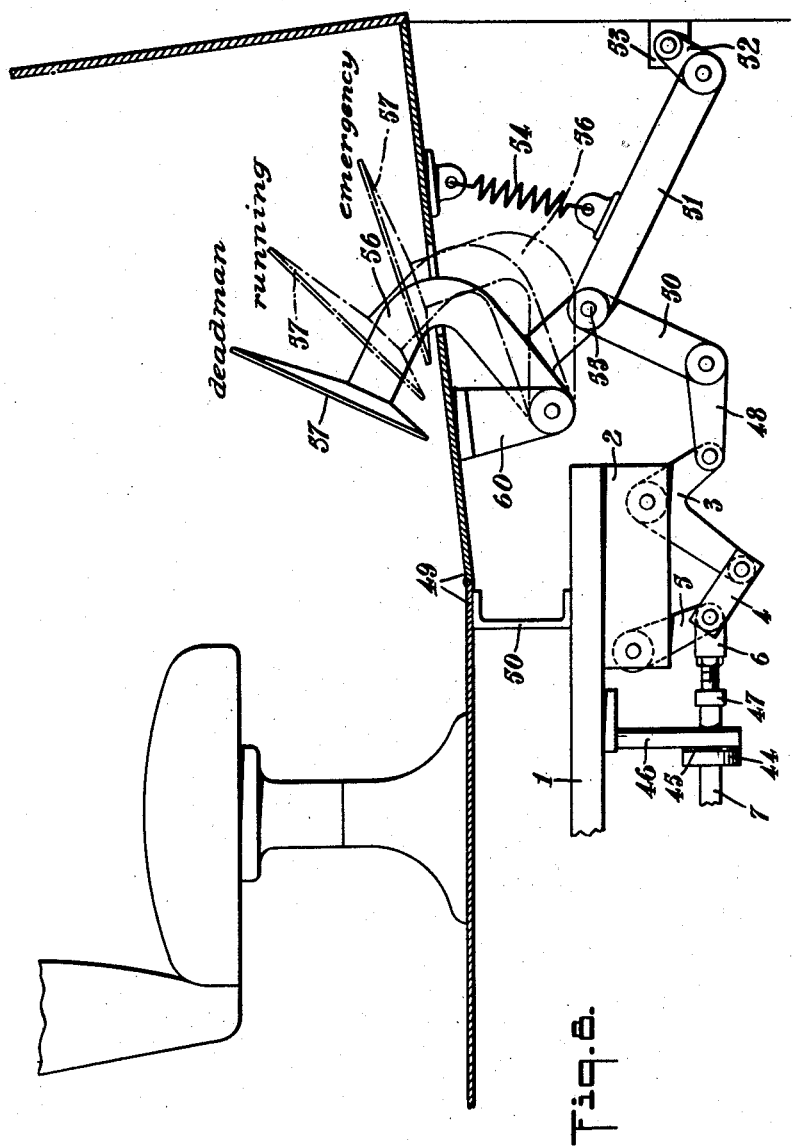

Patented Sept. 12, 1950

2,521,973

UNITED STATES PATENT OFFICE 2,521,973

CONTROL DEVICE AND OPERATOR THEREFOR

Wallace Hamilton, Albany, N. Y., assignor to Consolidated Car-Heating Company, Inc., Albany, N. Y., a corporation of New York Application August 2, 1946, Serial No. 688,145

4 Claims. (Cl. 200—153)

This invention relates to improvements in control devices, specifically interlock switches for the control of power operated vehicles having electrically actuated or controlled brakes, warning devices, power operated doors and safety interlocks.

This invention is concerned with improvements in so-called "dead man" controls as commonly used on all types of power operated vehicles which under present practice usually have power operated doors. As is well known, the so-called "dead man's" control is arranged so that it is consciously held by the vehicle operator in a running position, and should the operator for any reason fail to hold the manual which positions the control in running position it will automatically return to emergency position. In the usual types of control of this kind should the operator become unconscious for example and fall on the manual which operates the control it can, and has in the past, been held in running position causing serious accidents.

The broad object of this invention is to provide a control device of this type having a manual operator which must be consciously held in a running position for normal operation, but which will cause emergency operation at either of its two extreme positions of movement on either side of running position. Such a control device commonly takes the form of an electric switch which is the type illustrated in the attached drawings. This switch is controlled by means of a foot pedal which normally moves to and stays in what may be termed "dead man's" position, at which time, as is well known in the art, the vehicle power plant is rendered ineffective, the doors are released for manual opening, the brakes are applied and other incidents to safety operation take place. The other extreme position of the pedal which might occur if the operator fainted and fell on it has been termed an emergency position which in so far as functions are concerned is the same as the "dead man's" position. Thus the "dead man's" position and the emergency position of the structure herein disclosed produce the same result. An intermediate position for the pedal in which it must be consciously held by the operator under normal conditions is the running position.

An object of this invention is to provide a control device of this type, specifically an electric interlock switch so constructed that in an intermediate position the utilities of the vehicle are set for normal operation and in either extreme position they are set for emergency or abnormal operation, and a manually actuated operating mechanism associated therewith.

Other objects of the invention involve structural features of such an arrangement which will become apparent from the following description of the embodiment of the invention illustrated in the attached drawings.

This invention resides substantially in the combination, construction, arrangement and relative location of parts, all as will be described in detail below.

In the accompanying drawings,

Figure 1 is a side elevational view of the interlocking switch of this invention showing the parts in "dead man's" position;

Figure 2 is a side elevational view of the mechanism of Figure 1 with the parts in the same position with some parts broken away;

Figure 3 is a side elevational view of the switch showing it in running position with some parts broken away;

Figure 4 is an enlarged detail view from the operating end of the switch showing the parts in emergency position;

Figure 5 is a cross-sectional view taken on the line 5—5 of Figure 2;

Figure 6 is a cross-sectional view taken on the line 6—6 of Figure 2;

Figure 7 is a detailed view partly in cross-section of a toggle control forming part of the switch; and Figure 8 is a side elevational view with some parts in cross-section and some parts broken away, showing the operating mechanism for the switch.

As illustrated the switch comprises a unitary structure having a common base 1 of any suitable insulating material. Mounted on one end of the base is a U-shaped bracket 2, in which are pivotally mounted the bell crank lever 3 and the single lever 4. One of the arms of the bell crank lever is pivotally connected to a link 48 of the pedal operating mechanism which will be described in connection with Figure 8. The other arm of the bell crank is pivotally connected by a pair of links to the lever 5 which is also pivotally connected to a shackle member 6. This member is adjustably mounted on the end of a rod or shaft 7 which is of square cross-section except at its terminal ends which are round and threaded for attachment to the shakle 6 which is adjustably held thereon by means of a lock nut, as shown. Similarly a shackle 8 is threadedly mounted on the circular opposite end of the shaft 7 and pinned thereto, as shown. The shackle is pivotally connected to an arm 10 of a bell crank lever 9 pivotally mounted on a U-shaped bracket 11 also secured to the base 1 but at the other end. The arm 10 is a separable part of the bell crank 9 and is made of insulating material of any suitable kind. The bracket 11 has a terminal extension 12 to which one of the circuit connections for the device can be made.

The other arm of the bell crank 9 is pivotally connected by a pair of links 13 on the outer end of which is a contact 14 in the form of a metal roller (see Figs. 2 and 7). The roller has a diametrical hole therethrough in one end of which slides a pin 15 which has a shackle end. A compression spring lies between the shackle end and the roller 15 to permit sliding movement of the pin in the roller 14. The shackle end of this pin pivotally engages a pin mounted in the other arm of the bell crank 9, as clearly shown in Figure 2.

The base 1 is provided with a striking plate 18 against which the contact 14 hits as it moves to open position. Another U-shaped bracket 19 is mounted on the base as shown and serves as a support for a magnetic blow-out coil or winding 20. Mounted on and extending from the bracket 19 towards the bracket 11 are a pair of magnetic arms or plates 21 to which are secured the longitudinal and transverse plates 22 of some suitable insulating material and upon which a cylindrical shaped contact 23 is mounted. The magnetizible plates 21 form the pulse for the blow-out coil 20 between which a magnetic field is created in which the arc formed with the contacts 14 and 23 is created. The magnetic field of course serves to extinguish the arc in accordance with well known principles. One terminal of the winding 20 is connected to the clamp 24 of a terminal plug which has a circuit receiving terminal lug 25. The other terminal is connected to one of the metal plates 21, and thence to the contact 23. The other circuit wire is of course connected to the terminal lug 12.

Pinned on the shaft 7 adjacent the mechanism just described is a sleeve 7' of insulating material against the end of which a washer or collar 26 bears. This collar serves as a seat for a relatively heavy compression spring 27 which bears against a bar 28 of insulating material slidably mounted on the shaft 7. The shaft 7 as previously mentioned being of cross-sectional shape and the aperture through the cross bar 28 being square it is held in proper horizontal position. As will appear later, sliding movement of the cross bar under the action of spring 27 is limited by means of a collar 30 pinned to the shaft 7, as shown. Mounted along the base 1 in longitudinal spaced relation are pairs of contact posts 29, 35, 42 and 46 each provided with circuit wire connectors as clearly shown in Figures 1 and 2. The contact posts 29 are positioned to be engaged by the cross bar 28 for a purpose to be later described.

Slidably mounted on the rod 7 are four contact holders 31, 36, 40 and 44 of insulating material. These holders likewise have square apertures to prevent relative rotational movement thereof on the shaft. Each of these holders carries a contact arm 32, 37, 41 and 45 respectively projecting diametically from opposite sides thereof so as to be engageable with the associated contact posts. As is indicated in the drawings, each contact post with the exception of the posts 46, and each contact arm with the exception of the contact arm 45, is provided with actual contact pieces of suitable non-sparking, wear-resisting metal, as is well known in the switch art.

The collar 30 serves as a stop for the insulating support 31. A compression spring lies between this support and a collar 34 pinned to the shaft 7. This collar serves as a stop for the support 36 on which in turn bears a compression spring 38 which seats at its other end on the collar 39 pinned to the shaft 7. This collar serves as the stop for the support 40 on which seats a compression spring 43 which seats at its other end on the support 44. A collar 47 pinned to the shaft serves as a stop for this support.

The link 48 is pivotally connected to a link 50 which is pivotally connected at 55 on the end of a transverse arm forming part of the pedal 57. This pedal is pivotally mounted on a bracket mounted underneath the floor 49 of the vehicle. A link 51 is also pivotally connected at 55 to the foot pedal 57 and pivotally connected to a short link 52 which in turn is pivotally supported on a bracket 53 secured to a convenient part of the vehicle. A tension spring 54 interconnects the link 51 with an anchor post also mounted on the vehicle.

A description of the operation of this mechanism follows: The parts are normally in the position shown in Figures 1 and 8, which as previously stated, is the "dead man's" position. At this time contact blade 45 interconnects the posts 46 and all the other blades are out of engagement with the contact posts with which they cooperate. At this time the cross bar 28 bears on the post 29 and contact 14 engages contact 23. Thus the magnetic blow-off coil 20 is energized. The various vehicle utilities are then conditioned for emergency operation, as for example the brake is applied through the switch including the contacts 14 and 23, or the brake controls are energized to apply the brake and the other utilities of the vehicle are conditioned for emergency operation, all in accordance with well known practice. As for example, the doors are released for manual actuation.

In order to position the switch for normal running condition and normal operation of the various utilities on the vehicle, the operator depresses the pedal 57 from the full line position shown in Figure 8 to the intermediate dotted position which is the running position. In doing this the linkage system is operated while placing the spring 54 under tension, so as to cause clockwise rotation of the bell crank lever 3 from the position shown in Figure 8 to the position shown in Figures 3 and 4. The movement of the bell crank 3 to this position causes movement of the lever 5 to the position shown in Figure 3, and causes the shaft 7 to move to the left to the position shown in Figure 3. In so doing the switch at the contacts 14 and 23 is opened, releasing the brakes from emergency condition and conditioning them for normal control. The opening of this switch is effected by a snap action through the movement of the toggle or over-center connection provided by the linkage support 13, the pins 15 and the bell crank 9 under the action of spring 16. When the shaft 7 begins to move to the left the first thing that happens is that the contact arms 41 engage the posts 42 and as this occurs spring 43 relaxes. Contact arm 45 remains in engagement with the post 42 during this period and until contact arm 41 engages the post 42. As the shaft 7 moves to the left, spring 27 exerts a reaction to aid this movement against the cross bar 28 which is resting on the post 29. This spring 27 aids in overcoming the resistance to movement of the parts offered by the over-center mechanism and particularly the spring 16 thereof. Continued movement of the shaft to the left results in rotating the bell crank 9 so that suddenly the over-center mechanism passes center and snaps the parts to a position where the contact arms 37 and 32 engage the posts 35 and 29 respectively.

During this movement spring 43 is now compressed as the collar 47 engages the support 44 and moves the contact arms thereon out of engagement with the post 46. As the contact arms 37 and 32 engage their respective posts they come to rest and the shaft 7 slides through the supports 31 and 36 compressing the springs 33 and 38 against the collars 34 and 39 respectively. Just before the contact arms 37 and 32 engage their posts the cross bar 28 is engaged by the collar 30 (spring 27 being then relaxed a maximum amount) and the cross bar 28 then travels with the shaft 7. The closing of the switches which includes the contact arms 41, 37 and 32 condition the circuits controlled thereby so that the utilities of the vehicle are set for normal control and operation.

Should the pedal 57 be released, as for example if the operator fainted, the highest tension spring 54 will return the pedal 57 to full line position, carrying the connected linkage system with it to the full line position of Figure 8 and pulling the switch back in a reverse operation to the position shown in Figures 1 and 2. As previously explained, this is the "dead man's" position and everything is conditioned for emergency operation.

On the other hand, should the vehicle operator faint, for example, and fall on the pedal 57, it would be moved to the second dotted or emergency position illustrated in Figure 8, in which event the bell crank lever 3 would move to the position shown in Figure 4 and in so doing would return the lever 5 to the position shown in Figure 1 through the linkage connection 4. In that event all of the switch parts would return to the position shown in Figures 1 and 2, which is the same position as the "dead man's" position. In this position the switch, including the blade 45, is closed and the switches including blades 32, 37 and 41 are open. The brake switch including the contacts 14 and 23 will be closed.

With this arrangement it will be seen that the main switch or control device returns to emergency or "dead man's" position for either extreme position of the pedal 57.

From the above description it will be apparent to those skilled in the art that the subject matter of this invention is capable of detailed variation without departure from the novel scope thereof. I do not, therefore desire to be limited to the specific structural features herein provided, for illustrative purposes, but only as required by the appended claims.

What is claimed is:

1. A switch mechanism as described comprising a member movable to a first and second position, spring biased overcenter means connected to said member for holding it in either of said positions, a spring biased contact movably mounted on said member, a fixed terminal member engageable by said contact, said contact being disengaged from said fixed terminal in the first position of said movable member, a pivotally mounted lever and a link connecting said lever to said movable member whereby said movable member is moved from its first position to its second position upon initial movement of said lever to engage said contact with said fixed terminal, and is moved from its second back to its first position upon further movement of said lever in the same direction to cause said contact to disengage said fixed terminal.

2. In the combination of claim 1, said movable member being movable in a longitudinal direction and means for supporting it for such movement.

3. In the combination of claim 1, said movable member being movable in a longitudinal direction and means for supporting it for such movement including a pivotally mounted second lever pivotally connected thereto, said link pivotally interconnecting said first lever with said movable member.

4. In a switch mechanism of the type described, the combination comprising an operating member, means for supporting said member for sliding longitudinal movement, at least one spring biased contact arm slidably mounted on said member, a fixed terminal normally disengaged from said contact arm but engagable thereby, a spring biased overcenter mechanism connected to said member for holding it in either of two positions, and an operating lever pivotally connected to said member to move said member longitudinally from a first position to cause said contact arm to engage said fixed terminal and to return said operating member back to starting position upon further movement of said lever in the same direction.

WALLACE HAMILTON.

REFERENCES CITED

The following references are of record in the file of this patent:

UNITED STATES PATENTS

| Number | Name | Date |
| --- | --- | --- |
| 719,991 | Brown | Feb. 10, 1903 |
| 2,067,332 | Numer | Jan. 12, 1937 |